(No Model.)

J. RING.
GAS PUMP.

No. 267,653.

2 Sheets—Sheet 1.

Patented Nov. 14, 1882.

Attest:
Charles Pickles
Albert J. Fish

Inventor:
Jno. Ring
By Knight Bros
Attys (No Model.) 2 Sheets—Sheet 2.
J. RING.
GAS PUMP.
No. 267,653. Patented Nov. 14, 1882.
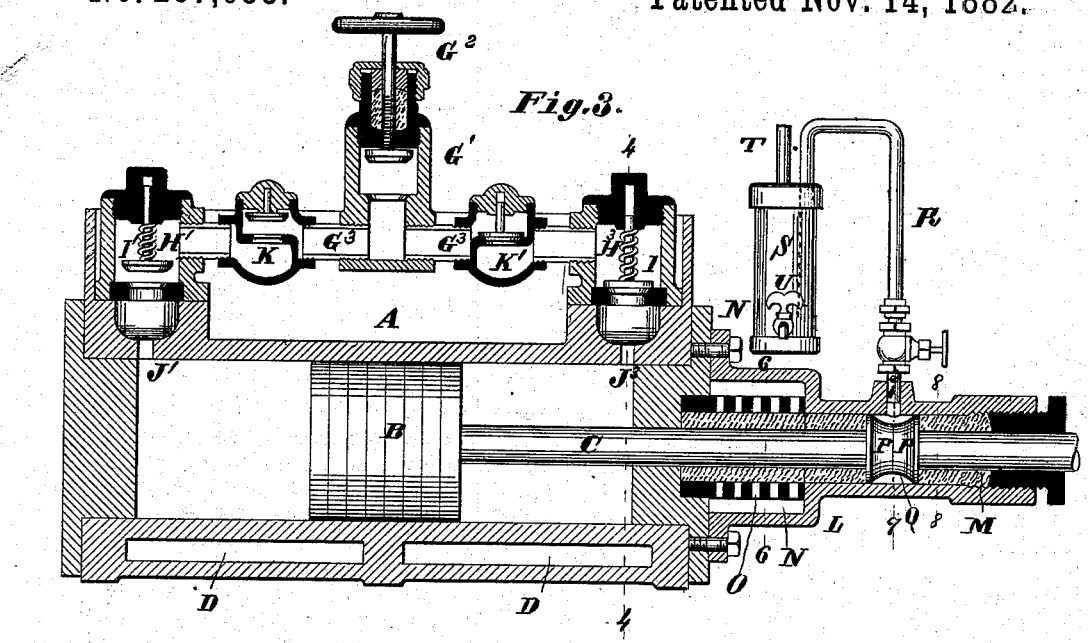
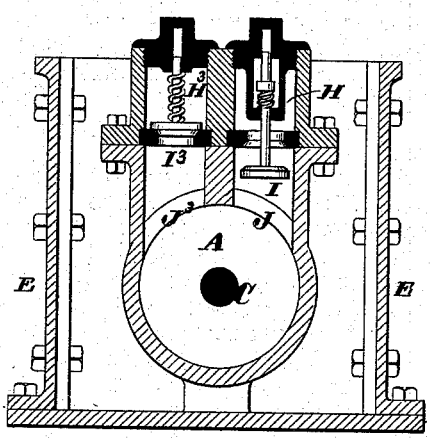
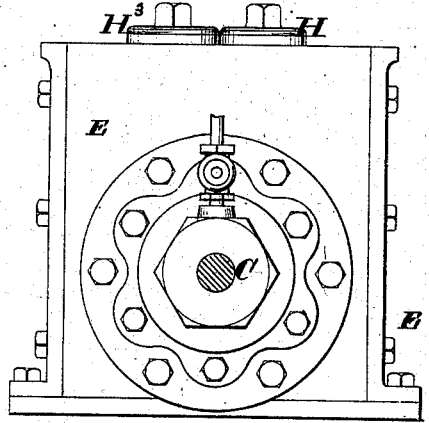
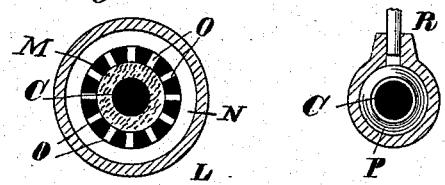
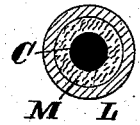
Attest:
Charles Pickles
Albert J. Fish
Inventor:
Jno. Ring.
By Knight Bros
attys.
N. PETERS, Photo-Lithographer, Washington, D. C.

United States Patent Office.

JOHN RING, OF ST. LOUIS, MISSOURI.

GAS-PUMP.

SPECIFICATION forming part of Letters Patent No. 267,653, dated November 14, 1882.

Application filed August 2, 1882. (No model.)

*To all whom it may concern:*

Be it known that I, JOHN RING, of the city of St. Louis, in the State of Missouri, have invented a certain new and useful Improvement in Gas-Pumps, of which the following is a full, clear, and exact description, reference being had to the accompanying drawings, forming part of this specification, and in which—

Figure 1:
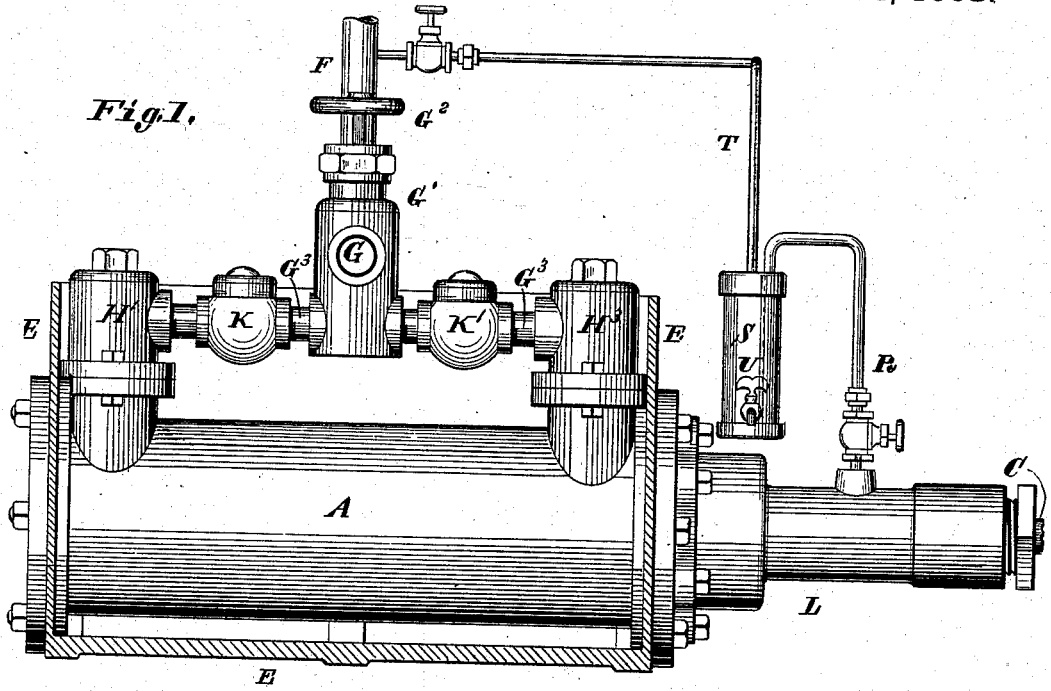
Figure 2:
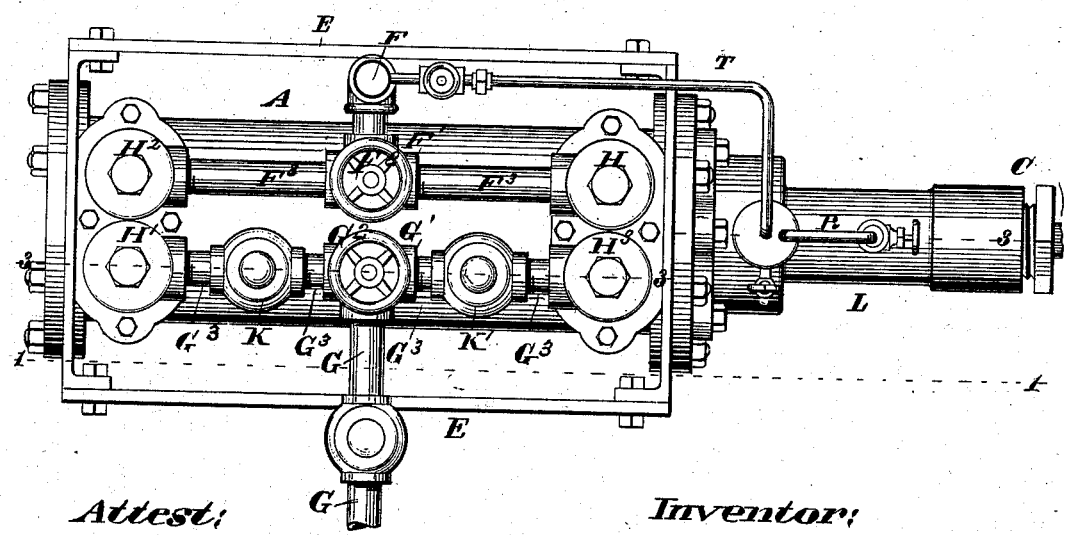

Figure 1 is a side elevation of the pump, showing the inclosing water-jacket in vertical section on line 1 1, Fig. 2. Fig. 2 is a top view. Fig. 3 is a vertical section taken on line 3 3, Fig. 2. Fig. 4 is a transverse section taken on line 4 4, Fig. 3. Fig. 5 is an end view, the cylinder being inclosed in its jacket or case. Fig. 6 is a transverse section through the stuffing-box, taken on line 6 6, Fig. 3. Fig. 7 is a transverse section through the oil and gas collecting-chamber, taken on line 7 7, Fig. 3; and Fig. 8 is a transverse section of the stuffing-box, taken on line 8 8, Fig. 3.

My invention relates to an apparatus for condensing ammonia and other gases; and my invention consists in various points of novelty, shown in the accompanying drawings, and hereinafter fully described and claimed.

A represents the pump-cylinder; B, the piston, and C the piston-rod. The cylinder is preferably constructed with the ordinary water-chamber, D, for keeping its interior cool, and it is also preferably placed within a case or jacket, E, containing water.

F represents the suction or supply pipe having branches $F^3 F^3$, and G the discharge or condenser pipe having branches $G^3 G^3$. These pipes F and G are supplied respectively with valves F' and G', for closing communication between the pump and the pipes, their stems passing up through ordinary stuffing-boxes, and having on their upper ends suitable hand-wheels, $F^2 G^2$.

I have shown a double-acting pump, the valves F' and G' being placed near the middle of the cylinder, and the pipes F and G branching respectively therefrom to the opposite ends of the cylinder, and communicating respectively with chambers H $H^2$ H' $H^3$, which are provided with drop-valves I, and which communicate with the interior of the cylinder by means of ducts or passages J.

In practice it has been found that when there is a heavy condenser-pressure the valves on the pressure side of the pump are liable to flutter and not be able to seat themselves under the extreme pressure, and the gas passing through them at such times seriously affects the operation of the pump by preventing the gas, under low pressure, from entering the cylinder on the suction side of the pump. To effectually avoid this difficulty, I place in each branch of the discharge or pressure pipe, between the main valve G' and the chambers H' $H^3$, check-valves K K', as shown in Figs. 1, 2, and 3, which do not interfere with the exit of the gas, but thoroughly prevent any return.

L represents the stuffing-box of the piston-rod, and M the packing. The box next to the cylinder has an oil-chamber, N, from which oil escapes to the packing to lubricate the piston-rod through orifices O.

Q is an annular chamber within the stuffing-box, preferably formed by two tapering rings, P, surrounding the piston-rod, their small ends being placed together. This chamber Q receives any gas and oil, or either, that may be escaping through the box, said gas and oil entering the chamber between the two rings, and also between the rings and the outer wall of the box. The chamber Q communicates with the suction-pipe F of the pump, and preferably by means of a pipe, R, which communicates with the chamber and with a receiving vessel or trap, S, said vessel being connected by means of a pipe, T, with the suction-pipe F. Thus the oil and gas that accumulate in the chamber Q are sucked out, the vessel S receiving the oil, and the gas, passing on through the pipe T, enters the suction-pipe and is returned to the pump. The pipe R preferably enters the top of the vessel, and it extends down inside, as shown by dotted lines, a suitable distance, so that the oil will not be taken up by the suction through the pipe T. The oil can be taken from the vessel by means of a cock, U. The pipes R and T should be provided with couplings and valves, as shown, so they can be disconnected, when desired, for repairs, &c.

The chamber Q may communicate direct with the suction-pipe F by means of a pipe, and the gas and oil be carried together into the pump; but I prefer to separate them, as described.

The operation of the machine is as follows: The gas entering the suction or supply pipe F is drawn by the backward stroke of the piston B through said pipe F, the valve F' into the branch pipe F³ leading to chamber H, whose valve I opens downwardly, as shown in Fig. 4, thence into the cylinder A through the duct J. At the same time any gas which may have been collected in the cylinder A, by the former stroke of the piston B, passes out through the duct J' to the upwardly-opening valve I' in chamber H', thence through upwardly-opening valve K into the discharge-pipe G through the branch G³ and valve G', the valve K' being seated. The forward motion of the piston B draws the gas through the branch F³, connecting with the chamber H², thence through a downwardly-opening valve, similar to I, into the cylinder A, through a duct similar to J, the gas in front of the piston passing through the duct J³, valve I³, chamber H³, valve K', to the discharge G by way of the branch pipe G³, connecting with valve G'.

I claim—

1. In a gas-pump, a chamber formed in the stuffing-box, and communicating by means of a pipe or pipes with the suction-pipe of the pump, for the purpose set forth.

2. In a gas-pump, an annular chamber formed in the stuffing-box to collect gas and oil, and communicating by means of a suitable pipe with a receiving-vessel which retains the oil, and which communicates by means of a pipe with the suction-pipe of the pump for the return of the gas to the pump, as set forth.

3. In a gas-pump, the check-valves K K', in combination with the discharge-pipe G, having branches G³ G³ and valve G', and the chambers H' H³, having check-valves I' I³, as set forth.

4. In a gas pump, an annular chamber, Q, formed in the stuffing-box by means of tapering rings P, surrounding the piston-rod, in combination with a suction-pipe, R, vessel S, and gas suction pipe T, communicating with the main feed-pipe of the pump, all substantially as shown and described, for the purpose set forth.

JOHN RING.

Witnesses:
 GEO. H. KNIGHT,
 ALBERT G. FISH.